(12) United States Patent
Nieminen et al.

(10) Patent No.: US 12,427,531 B2
(45) Date of Patent: Sep. 30, 2025

(54) SAND USED IN INDUSTRY

(71) Applicant: Resand Oy, Nuutajärvi (FI)

(72) Inventors: Jukka Nieminen, Nuutajärvi (FI); Toni Wesin, Nuutajärvi (FI); Kalle Kekäläinen, Nuutajärvi (FI)

(73) Assignee: Resand Oy, Nuutajärvi (FI)

( * ) Notice: Subject to any disclaimer, the term of this patent is extended or adjusted under 35 U.S.C. 154(b) by 0 days.

(21) Appl. No.: 18/250,592

(22) PCT Filed: Oct. 25, 2021

(86) PCT No.: PCT/FI2021/050712
§ 371 (c)(1),
(2) Date: Apr. 26, 2023

(87) PCT Pub. No.: WO2022/090616
PCT Pub. Date: May 5, 2022

(65) Prior Publication Data
US 2023/0415167 A1    Dec. 28, 2023

(30) Foreign Application Priority Data

Oct. 27, 2020   (FI) .................................. 20206063

(51) Int. Cl.
| | |
|---|---|
| *B22C 5/04* | (2006.01) |
| *B03B 9/00* | (2006.01) |
| *B09B 3/35* | (2022.01) |
| *B09B 3/40* | (2022.01) |
| *B22C 5/06* | (2006.01) |

(52) U.S. Cl.
CPC .................. *B03B 9/00* (2013.01); *B09B 3/35* (2022.01); *B09B 3/40* (2022.01); *B22C 5/04* (2013.01); *B22C 5/06* (2013.01)

(58) Field of Classification Search
CPC .................................... B22C 5/04; B22C 5/06
USPC .................................. 164/5; 209/4, 5, 38, 39
See application file for complete search history.

(56) References Cited

U.S. PATENT DOCUMENTS

| | | | | |
|---|---|---|---|---|
| 5,540,270 A | * | 7/1996 | Grote et al. .............. | B09C 1/00 164/5 |
| 2008/0202986 A1 | | 8/2008 | Fontaine | |

FOREIGN PATENT DOCUMENTS

| | | |
|---|---|---|
| CA | 2844052 A1 | 1/2013 |
| CN | 101870562 B | 5/2012 |
| CN | 103406490 B | 11/2015 |
| DE | 4321297 A1 | 1/1995 |
| DE | 202006014090 U1 | 2/2007 |

(Continued)

OTHER PUBLICATIONS

International Search Report and Written Opinion of the ISA for PCT/FI2021/050712 mailed Feb. 16, 2022, 12 pages.

(Continued)

*Primary Examiner* — Kevin P Kerns
(74) *Attorney, Agent, or Firm* — Nixon & Vanderhye PC

(57) ABSTRACT

In the disclosed solution, a method is described for producing sand used in industry, in which method discarded power plant and/or foundry sand is processed into sand for use in products of the construction industry and/or into foundry sand via pre-treatment, drying, and after-treatment. In addition, an apparatus is described for producing sand used in industry, and use of discarded power plant and/or foundry sand in products of the construction materials industry or in foundry industry.

8 Claims, 2 Drawing Sheets

(56) References Cited

FOREIGN PATENT DOCUMENTS

| EP | 0653389 A1 | 5/1995 |
| EP | 1375455 A1 | 1/2004 |
| EP | 3797896 A1 | 3/2021 |
| KR | 201200019833 A | 1/2012 |
| RU | 1582447 C | 2/1999 |
| WO | 2011082464 A1 | 7/2011 |
| WO | 2019081815 A1 | 5/2019 |

OTHER PUBLICATIONS

Finland Search Report for FI20206063 mailed Apr. 20, 2021, 2 pages.

* cited by examiner

SAND USED IN INDUSTRY

This application is the U.S. national phase of International Application No. PCT/FI2021/050712 filed Oct. 25, 2021 which designated the U.S. and claims priority to FI 20206063 filed Oct. 27, 2020, the entire contents of each of which are hereby incorporated by reference.

BACKGROUND OF THE INVENTION

The invention relates to sand used in industry.

Further, the invention relates to a method and apparatus for making sand used in industry as well as to using discarded power plant sand in industry. The invention additionally comprises sand for products of the building materials industry and/or for foundry sand.

The sand used in industrial products is usually natural sand. Natural sand is typically produced abroad, transported by ship to Finland and by lorry to a customer. This consumes a vast amount of natural resources.

Foundry sand is a material which is used in mould manufacture at a sand foundry and obtained from natural sand. One of the biggest challenges and problems of foundries is the final disposal of moulding sand left over from single-use moulds. When a foundry manufactures castings, as much waste sand is on average created as are finished cast products. There are different techniques to recycle sand, but they are used relatively little, which is due to expensive investment costs of the methods and their inadequate capacity.

Power plant boiler sand is used in power plants to form a firing grate. The purpose of sand is to form a layer of sand, that is, a bed, where the burning of the fuel fed into the boiler takes place. The power plant boiler sand used in power plant boilers is typically bed sand made of natural sand, whereby the fraction which is suitable as bed sand in its particle size, is collected from natural sand as bed sand. Discarded power plant sand usually ends up at a landfill site. Metals are sometimes recovered from it, after which the remaining sand is waste.

The problem is the discarded sand waste from foundries and power plants, which causes a huge environmental burden and increases production costs in particular due to ever increasing costs of waste. At the same time, products of the construction materials industry make use of natural sand. Ecologically it would make sense to develop a cleaning process for sand, in which the amount of natural sand was smaller and the proportion of recycled sand in the products of the building materials industry and in foundry industry were increased.

BRIEF DESCRIPTION OF THE INVENTION

It is therefore an object of the invention to develop new sand used in industry, as well as a method and apparatus implementing the method, which are characterised by what is stated in the independent claims. Some preferred embodiments of the invention are disclosed in the dependent claims.

In the solution set forth, sand used in industry is produced by processing discarded power plant boiler sand for sand to be used in products of the construction industry and/or for foundry sand by means of pretreatment, drying, and after-treatment.

Discarded power plant boiler sand goes through a number of processes where the structure of sand changes. In such a case, various binders are removed from the surface of a grain of sand and the surface wears out and becomes rounder by the effect of mechanical wear, whereby the sand is more suitable than natural sand in products of the construction materials industry and for use in foundries.

An advantage of the invention is also that foundry and power plant boiler sand left over from power plants may be re-used in products of the construction materials industry and/or as foundry sand, and there is no need to transport leftover sand to a landfill whereby there is a substantial reduction in the amount of waste, and the cost of sand for foundries and power plants is reduced. Furthermore, there is no need to dig up natural sand to the same extent as before, which preserves limited natural resources.

The recycling solution of the invention responds to the global environmental challenge such as environmental contamination, climate change, and resource sufficiency. At the same time it boosts industrial competitiveness as a result of more efficient use of materials, energy, and other resources.

BRIEF DESCRIPTION OF THE DRAWINGS

The invention is now described in closer detail in connection with preferred embodiments and with reference to the accompanying drawings, in which.

DETAILED DESCRIPTION OF THE INVENTION

Figure 1:
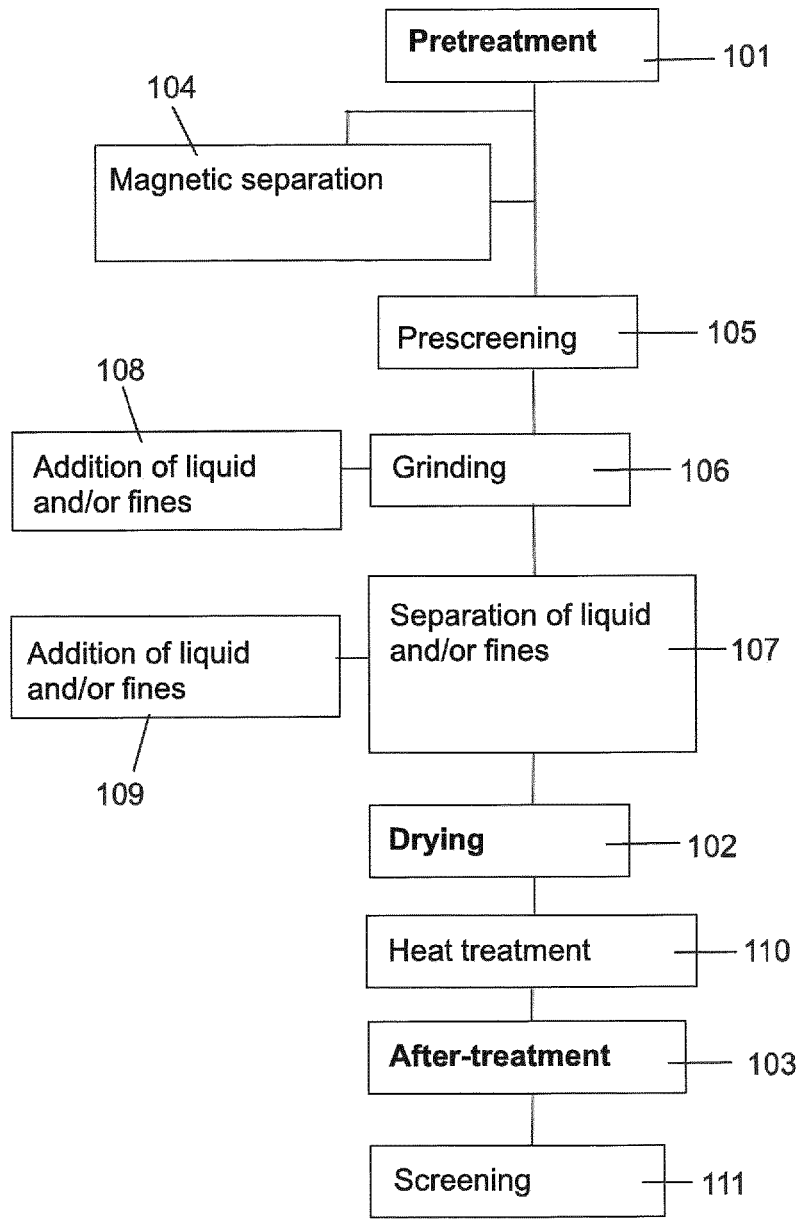
FIG. 1 is a schematic view of a method for producing sand used in industry.

FIG. 1 is a schematic view of a production process for producing sand used in industry. Later on, the power plant boiler and foundry sand used in this description may also be referred to as power plant and foundry sand, or just sand. Discarded power plant boiler and/or foundry sand refers to all the sand that has been used in the power plant and foundry industries, as well as to leftover sand from manufacturing a casting mould. In the embodiment of FIG. 1, the sand used in industry is produced by a method where discarded sand from a power plant and/or foundry is processed into sand used in products of the construction industry and or foundry sand by means of pretreatment 101, drying 102, and after-treatment 103. The production process may relate to power plant or boiler sand, only, but if need be also their combination if acid and alkaline sand are to be combined. According to an embodiment, discarded sand from a power plant is processed into sand used in products of the construction industry and or foundry sand by means of pretreatment 101, drying 102, or after-treatment 103. Used power plant sand is well suited to the production of foundry sand. According to an embodiment, sand produced according to the aforementioned method and used in industry may replace, either partly or fully, natural sand used in the products of the construction materials industry and/or foundries. This way, used power plant and/or foundry sand may be reused whereby there is no need to transport sand to a landfill site and natural resources are saved. According to an embodiment, a product of the construction materials industry may comprise at least one of the following: a concrete product, plaster, floor compound product, filler, acrylic compound, and/or filter sand.

According to an embodiment, pretreatment 101 comprises magnetic separation 104, prescreening 105, grinding 106, and separation of liquid and fines 107. At the pretreatment phase 101, the metals in the discarded power plant and/or foundry sand may be removed by magnetic separation 104.

This way, the metals can be recovered and the sand made suitable for products of the construction materials industry and/or for foundry sand. If the discarded power plant and/or foundry sand arriving for processing contains lumps, they are crushed after which magnetic separation 104 may be performed, if necessary. Magnetic separation 104 may also be carried out in advance whereby the sand arriving for processing is free of metals. In such a case, the phase of magnetic separation 104 need not be performed at all.

According to an embodiment, pretreatment 101 may comprise prescreening 105, grinding 106, and liquid and/or fines separation 107. In prescreening 105, too large a sand fraction is separated from the discarded power plant and/or foundry sand. After this, the sand to be treated is transported to grinding, where it may be ground 106 by using, for example, water grinding. Grinding breaks the surface of the grain of sand and detaches binding agents on its surface. If water grinding is used, liquid such as water and/or a mixture of liquid and fines may be added 108 to the process. The liquid fines-containing mixture may comprise at least one of the following: additive, water, and fines. Grinding also rounds the grains of sand, making them particularly well suited to use in the construction materials industry. Rounder grains of sand allow a more uniform product, whereby a filler or plaster, for example, will become more uniform. Following grinding, the discarded power plant and/or foundry sand is washed and liquid and fines are separated 107 from it with a screen, for example. To facilitate washing, liquid and/or a mixture of liquid and fines may be added 109. The liquid may be water, pH regulator, and/or another substance needed for adjusting the mixture. The separated mixture of liquid and fines may still be separately treated with one or more cyclones, for example, the liquid fines mixture produced by which may be reused in grinding 106 and/or separation 107 of liquids and fines.

After pretreatment 101, the discarded power plant and/or foundry sand may be dried 102 by means of heat treatment 110, for example, where the moisture of the sand may be adjusted to the desired level. Then, an after-treatment 103 may be carried out by screening 111. According to an embodiment, after-treatment 103 comprises screening 111 where the remaining fines are removed and the sand is separated to sand grains of a suitable size for use in products of the construction materials industry and/or as foundry sand. To remove the fines, a suction machine may be used.

Discarded power plant and/or foundry sand may be used in products of the construction materials industry and/or foundry industry where discarded power plant and/or foundry sand may be processed by means of pretreatment, drying, and after-treatment according to the method shown in FIG. 1.

According to an embodiment, processed and discarded power plant and/or foundry sand may be used to partly or fully replace the sand used in a product of the construction materials industry and/or foundry industry. The sand to be replaced may be natural sand. In this case, it is possible to use merely sand produced according to the above method in a product, or part of the sand may be other sand such as natural sand.

According to an embodiment, treated, discarded power plant and/or foundry sand may be used as foundry sand and in all suitable products of the construction materials industry, including dry products, such as dry plaster mixtures into which liquid may be mixed later.

According to an embodiment, treated, discarded power plant and/or foundry sand is used in at least one of the following products of the construction materials industry: a concrete product, plaster, floor compound product, filler, acrylic compound, and/or filter sand.

Figure 2:
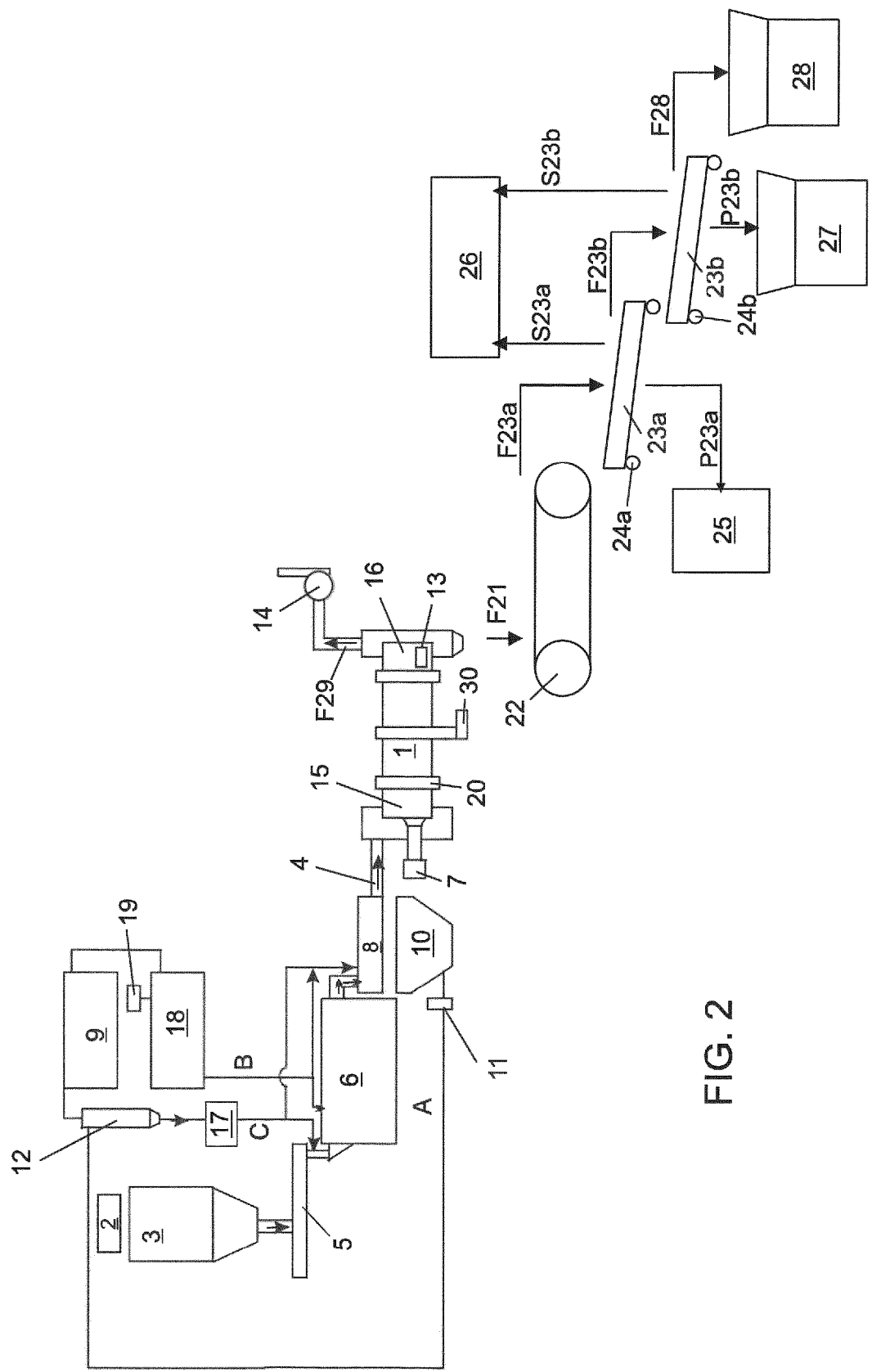
FIG. 2 is schematic view of an apparatus for producing sand used in industry.

FIG. 2 shows an apparatus for producing sand used in industry, the apparatus comprising means adapted to process discarded power plant and/or foundry sand into sand to be used in products of the construction industry and/or as foundry sand by means of pretreatment, drying, and after-treatment. According to an embodiment, the apparatus comprises means adapted to process discarded power plant sand into sand to be used in products of the construction industry and/or as foundry sand by means of pretreatment, drying, and after-treatment.

The apparatus may comprise a prescreen 5, grinder 6, used in prescreening, and a separation screen 8 for liquid and fines. Discarded power plant and/or foundry sand is received at pretreatment where it may pass through a pretreatment device 2 to a dosing feeder 3. In the pretreatment device 2, lumps in the sand are crushed into sand fraction, and the sand fraction is cleaned by means of a magnetic separator in the pretreatment device 2. If there are no lumps in the sand, and metals have already been separated from it, the sand is fed to the dosing feeder 3 directly, and the process completely lacks the pretreatment device 2. The sand may also go to the pretreatment device 2 for crushing, only. The dosing feeder 3 feeds the sand to be cleaned to a prescreen 5 where grains of sand smaller or as big as 10 mm, for example, are forwarded to be ground in a grinding apparatus 6. Grains of sand larger than 10 mm are led back to pretreatment for re-crushing. Grinding is implemented by either a vertical or horizontal grinding apparatus 6 in which liquid and/or at least one mixture B, C of liquid and fines is added. With liquid, such as water, a pH regulator may be added, if needed, but its use is not compulsory. The liquid and/or mixture of liquid and fines may comprise at least one of the following: water, water and additive, mixture of water and fines, mixture of water and fines without chromite particles. By means of the grinding apparatus 6, the grains of sand are mechanically ground against each other whereby a shell formed of a binding agent and surrounding the grains of sand is broken and the binding agents detach from the surface of the grains of sand and dissolve in the liquid. Grinding also causes the surface of the grains of sand to become round.

From the grinding apparatus 6, the mixture of sand and liquid is led to the separation screen 8 of liquid and fines, where water and/or at least one mixture B, C of liquid and fines is led to the screen for washing the sand. The liquid and/or mixture B, C of liquid and fines may comprise at least one of the following: water, water and additive, mixture of water and fines, mixture of water and fines without chromite particles. The separation screen 8 has a mesh through which the liquid mixture A, which may consist of at least one of the following: water, binding agent, additive and/or dust, can fall into a vessel 10 under the separating screen 8 to be further processed. From the separation screen 8, the ground and cleaned sand is conveyed by a conveyor 4 to an oven 1 for drying.

According to an embodiment, the grinding apparatus 6 may additionally have a screen through which the liquid mixture A, which may consist of water, binding agent, and/or dust, can directly access the vessel 10 to be further processed, and the sand is led from the grinding apparatus 6 by means of the conveyor 4 directly to the oven 1 for drying. In such a case, the separation screen 8 is not needed at all.

The mixture A of liquid and fines received by the vessel 10 is pumped to a cyclone 12 with a pump 11 for separation of fines. Separation of fines is used to produce a water-washed mixture B of liquid and fines and weight-separated mixture C of liquid and fines. Larger fines, separated in the cyclone 12, are led out of the process for further processing, and the finer fines to a water treatment vessel 9. The liquid mixture from the cyclone 12, which may include some fines, is led to a gravity separator 17 where fines may be separated even more. According to an embodiment, the gravity separator 17 may be used to separate chromite, for example, off of quartz fines, which allows chromite to be reused. The gravity-separated mixture C of liquid and fines is led from the gravity separator 17 to the grinding apparatus 6 and/or separation screen 8. According to an embodiment, the gravity-separated mixture C of liquid and fines may comprise a chromite-free mixture of liquid and fines.

The fines are led from the cyclone 12 to the water treatment vessel 9 for further processing. The water treatment vessel 9 may comprise a second cyclone for separating or filtering fines. Larger fines fractions are led out from the water treatment vessel for further processing, and the finer liquid mixture is led to a clean water tank 18 in which the pH of the fines mixture may be adjusted by adding hydrochloric and/or sulphur acid and/or other chemicals from a tank 19. The water-washed mixture B of liquid and fines in the clean water tank 18, which is nearly clean water, is led to the grinding apparatus 6 and/or separation screen 8.

The apparatus additionally comprises an oven 1 used for drying, in which the discarded power plant and/or foundry sand, modified in pre-treatment, is dried by warming up and rotating the oven 1. The discarded power plant and/or foundry sand is fed from the conveyor 4 to the oven 1 advantageously from a first end 15 of the oven. Heat energy produced by a heat source 7 is fed into the oven 1. The oven 1 may be thermally insulated to reduce heat losses. Heat losses may be recovered and used for example to preheat the sand to be cleaned or as a heat source for one or more properties. The oven 1 is substantially supported by supports 20. There are means advantageously arranged to the supports 20 for adjusting the inclination of the oven. The most essential thing is that is possible to adjust the inclination of the rotating oven 1. In addition, the apparatus has means 30 to rotate the oven 1 and to adjust the rotating speed.

From a second end 16 of the oven 1, flue gasses F29 are removed, with which also some of the dust that came with the sand to be dried is removed. With the flue gasses, impurities removed from the discarded power plant and/or foundry sand are also removed. The flue gasses are processed with appropriate filter arrangements 14 and cooled down to recover heat. The temperature of the oven is measured at the second end 16 of the oven 1 with one or more temperature sensors 13, and the dried sand is let run out F21 of the oven 1.

Drying the discarded power plant and/or foundry sand may take place at the temperature of 100 to 500° C., advantageously at the temperature of 200° C. According to an embodiment, the temperature of the oven 1 is adjusted on the basis of the average temperature and humidity of the sand being dried. The humidity and temperature of the sand may be measured by making use of information obtained from sensors of the apparatus control unit and actuators, for example. The humidity of the product is adjusted according to the product that the discarded power plant and/or foundry sand is to be used for. For example, the humidity of sand used for plasters is advantageously approximately 0.1%.

According to an embodiment, the control unit, not shown in the Figures, uses the information it has received concerning each time instant on the oven 1 temperature, amount of sand fed in the oven 1, advancing speed of the sand, degree of purification of the cleaned sand, temperature of the sand as it is being fed into the oven 1, temperature of exiting F21 sand, amount of heat energy fed in, heat losses in different parts of the apparatus and humidity of the sand, temperature of exiting flue gasses as well as other possible measured values as return data to perform future controls and adjustments. The control unit can, by means of the return data, make corrective adjustment actions, for example, in the control room to reach the target settings given to the control unit.

Dried sand is drained F21 out of the oven 1 from the second end 16 of the oven 1 to a conveyor 22, used to feed foundry sand forward in the production process. The operation of the conveyor 22 may be controlled with a motor, not shown for reasons of clarity, driving the conveyor 22. The operation of said motor may in turn be controlled with at least one control unit included in the apparatus.

The apparatus shown in FIG. 2 further includes a screening section for removing the fines in the discarded power plant and/or foundry sand, such as for removing dust and for screening the sand into a fraction of a suitable size. The screening section shown in FIG. 2 comprises at least one mesh 23a, 23b, advantageously there are two or three meshes. In the direction of travel of the power plant and/or foundry sand, so from left to right in FIG. 2, the first mesh 23a and second mesh 23b are adapted in the substantially horizontal direction successively and staggered downwards in relation to each other so that in the vertical direction the second mesh 23b may be located below the first mesh 23a at least to some extent. The meshes 23a, 23b may be tilted down to an angle of 0 to 15 degrees, for example, in the direction of travel of the power plant and/or foundry sand so that the beginning of the meshes 23a, 23b, that is, the end directed towards the feed of the foundry sand, is higher than the end of the meshes 23a, 23b, so the end directed towards the direction of travel of the foundry sand. In such a case, when the meshes 23a, 23b are shaken, the sand not filtered through the mesh 23a, 23b travels forward from left to right under gravity. Said angle may advantageously be 5 degrees. The tilt of the meshes 23a, 23b and operation of the shakers 24a, 24b may be controlled with the control unit, for example. The screen section may be partitioned separate from other apparatus of the production process by wall and/or roof structures, or each mesh 23a, 23b may be separately encased. Said wall and roof structures or enclosures are not shown in the drawing for reasons of clarity.

As schematically shown by the arrow F23a, the foundry sand is fed from the conveyor 22 onto the first mesh 23a. When the shakers 24a are shaking the first mesh 23a, the foundry sand moves forwards on the first mesh 23a. At the same time, as defined by the mesh size of the first mesh 23a, at least a portion of the foundry sand is separated from the foundry sand and is filtered through the first mesh 23a as schematically shown by the arrow P23a. The mesh size of the first mesh 23a is so selected that grains of sand smaller than a determined grain size are separated from the power plant and/or foundry sand by the first mesh 23a. The separating portion in question comprises at least dust and may also comprise other fines mixed in the power plant and/or foundry sand. Below the first mesh 23a, at least one first suction machine 25 is arranged to suck out of the process such material that passed through the first mesh 23a. In addition, at least part of the dust or other fines coming off the power plant and/or foundry sand during shaking may be also sucked out of the process as schematically shown by the arrow S23a by means of at least one second suction machine 26 also arranged over the meshes 23a, 23b. The operation of said at least one first suction machine 25 and at least one second suction machine 26, such as switching on and off as well as suction power, may be controlled with the control unit, for example.

The portion of the power plant and/or foundry sand which was fed to the first mesh 23a and did not pass through the first mesh 23a and did not end up in said at least one second suction machine 26, either, moves from the first mesh 23a to the second mesh 23b as schematically shown by the arrow F23b. The mesh size of the second mesh 23b is so selected that it passes, that is, separates, all the grains of sand smaller than the mesh size in question from the foundry sand into its own fraction as schematically shown by the arrow P23b. The portion of the foundry sand, which ended up in a first collecting tray 27 as indicated by the arrow P23b, forms a so-called fraction suitable for end use, that is, accepted for products of the construction materials industry. The dust or other fines still coming off the power plant and/or foundry sand on the second mesh 23b during shaking may be sucked out of the process as schematically shown by the arrow S23b by means of at least one second suction machine 26 arranged over the meshes 23a, 23b.

The portion of the foundry sand, which was fed on the second mesh 23b and did not pass through the second mesh 23b, either, ends up in a second collecting tray 28 as schematically shown by the arrow F28. This portion of the power plant and/or foundry sand comprises grains larger than the mesh size of the second mesh 23b. The portion of the power plant and/or foundry sand, which ended up in the second collecting tray 28, is sent on for further processing.

The mesh size for the meshes 23a, 23b is selected according to what the application of the approved fraction separated into the first collecting tray 27 is, in other words what is intended for products of the construction materials industry, or the grain size of the foundry sand. Typical applications for the processed and discarded power plant and/or foundry sand are concrete products, plasters, floor compound products, fillers, acrylic compounds, and/or filter sands.

By means of the apparatus shown in FIG. 2, sand produced for products of the construction materials industry and/of foundry industry comprises pretreated, dried and after-treated discarded power plant and/or foundry sand with the typical grain size of 0.05 to 2 mm, approximately. According to an embodiment, sand produced for products of the construction materials industry and/of foundry industry comprises rounded grains of sand that have been achieved by means of at least one grinding process performed with the apparatus. The grain size of the sand produced from discarded foundry sand is advantageously 0.1 to 0.5 mm, approximately. The grain size of the sand produced from discarded power plant sand is larger than foundry sand, with the advantageous grain size of approximately 0.5 to 1.5 mm.

When sand suitable for products of the construction materials industry and/or foundry sand is produced in the manner described in the above, the mesh size of the first mesh 23a may be selected to be approximately 0.1 mm, for example. This means that all the material of the grain size of approximately 0.1 mm, at the maximum, such as dust, is separated with the first mesh 23a off the foundry sand ending up on the mesh 23a and is sucked with at least one suction machine 25, 26 out of the production process. The mesh size of the second mesh 23b may in turn be selected to be advantageously approximately 0.5 mm. This means that all the fraction of the grain size of approximately 0.5 mm, at the maximum, ending up on the second mesh 23b is separated with the second mesh 23b off the power plant and/or foundry sand ended up on the second mesh 23b. The fraction separated with the second mesh 23b ends up in the first collecting tray. The portion of the power plant and/or foundry sand which did not pass through the meshes 23a, 23b or did not end up in at least one second suction machine 26 arranged over the meshes 23a, 23b, ends up in the second collecting tray 28 and is sent on for further processing. Similarly, if sand of a larger grain size is the goal, the grain size of the first mesh 23a may advantageously be selected as approximately 0.5 mm, and the second mesh 23b, 1.5 mm. The grain size of the meshes may be selected as desired according to the application.

With the solution set forth, most of discarded power plant and foundry sand may still be reused in products of the construction materials industry or as foundry sand. The solution increases recycling of materials and is ecological. Due to the rounded grains of sand, the produced sand is even better suited to products of the construction materials industry than natural sand.

Those skilled in the art will find it obvious that, as technology advances, the basic idea of the invention may be implemented in many different ways. The invention and its embodiments are thus not restricted to the examples described above but may vary within the scope of the claims.

The invention claimed is:

1. A method for producing sand usable in industry, the method comprising:
   processing discarded power plant sand into sand for use in construction industry products and/or into foundry sand, by pre-treatment, drying, and after-treatment,
   wherein the pre-treatment comprises prescreening, grinding, washing and separation of liquid and fines, wherein the sand is ground by water grinding, wherein the grains of sand are mechanically ground against each other so that a shell formed of a binding agent and surrounding the grains of sand is broken and the binding agents detach from the surface of the grains of sand and dissolve in the liquid, and
   wherein in the grinding and/or separation of liquid and fines, liquid and/or at least one mixture of liquid and fines is added, which liquid and/or at least one mixture of liquid and fines comprises at least water and additive.

2. The method as claimed in claim 1, wherein following pre-treatment, discarded power plant sand is dried by heat-treatment, and after-treated by screening.

3. The method as claimed in claim 1, wherein the grinding further rounds the grains.

4. The method as claimed in claim 1, wherein the grinding rounds grains of the discarded power plant sand.

5. A method of using discarded power plant sand, the method comprising:
   having discarded power plant sand that has been processed by pre-treatment, drying, and after-treatment,
   wherein the pre-treatment comprises prescreening, grinding, washing and separation of liquid and fines, wherein the sand is ground by water grinding, wherein the grains of sand are mechanically ground against each other so that a shell formed of a binding agent and surrounding the grains of sand is broken and the binding agents detach from the surface of the grains of sand and dissolve in the liquid, and
   wherein in the grinding and/or separation of liquid and fines, liquid and/or at least one mixture of liquid and fines is added, which liquid and/or at least one mixture of liquid and fines comprises at least water and additive; and applying the processed power plant sand in a construction materials industry product or in a foundry industry product.

6. The method as claimed in claim 5, wherein the processed sand is used to partly or fully replace sand that otherwise would be used in the construction materials industry product and/or the foundry industry product.

7. The method as claimed in claim 5, wherein the construction materials industry product and/or the foundry industry product is a dry product.

8. The method as claimed in claim 5, wherein the construction materials industry product and/or the foundry industry product is a concrete product, plaster, floor compound product, filler, acrylic compound, and/or filter sand.

* * * * *